Figure 1:
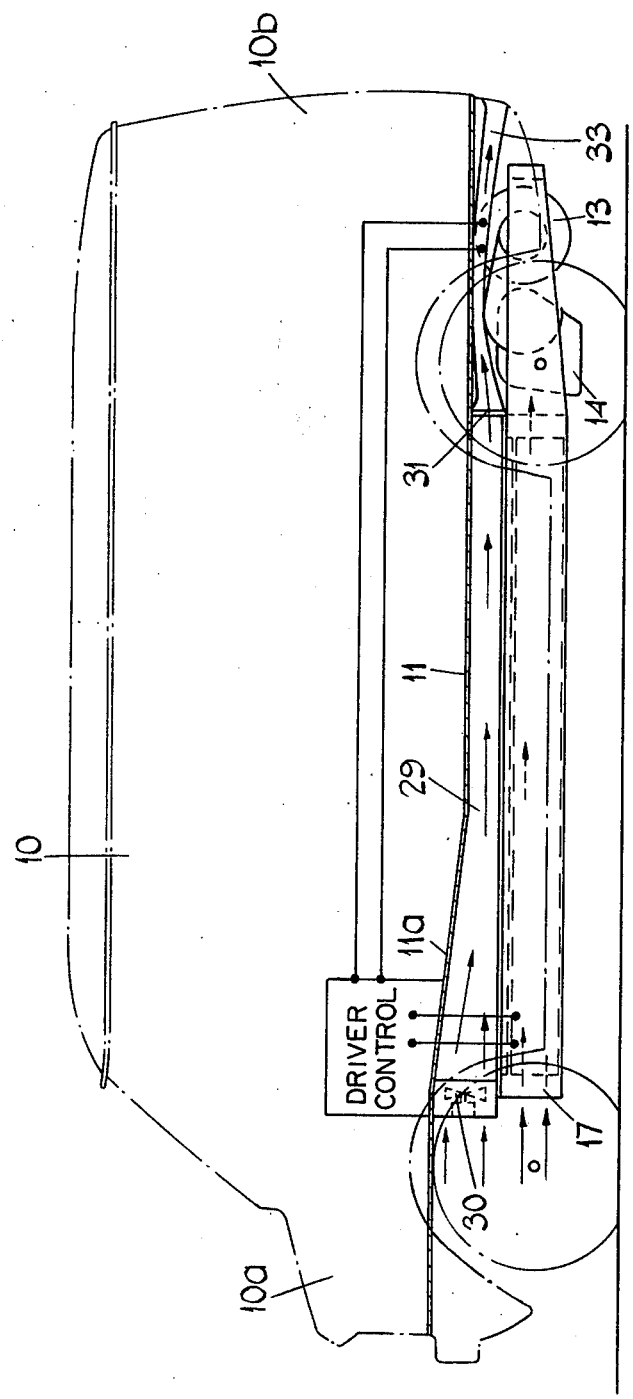

United States Patent [19]

Fowkes

[11] 4,135,593

[45] Jan. 23, 1979

[54] ELECTRICALLY DRIVEN VEHICLES

[75] Inventor: Ronald Fowkes, Solihull, England

[73] Assignee: Lucas Industries Limited, Birmingham, England

[21] Appl. No.: 719,305

[22] Filed: Aug. 31, 1976

[30] Foreign Application Priority Data

Sep. 10, 1975 [GB] United Kingdom ............... 37177/75

[51] Int. Cl.² ............................................. B60L 11/18
[52] U.S. Cl. .................... 180/65 R; 105/51; 180/68.5
[58] Field of Search ............ 180/65 R, 68.5, 60, 180/54 A; 105/51, 50, 49; 429/148, 71, 72, 99, 100, 96

[56] References Cited

U.S. PATENT DOCUMENTS

| 1,690,199 | 11/1928 | Lubeck | 180/65 R |
| 1,843,691 | 2/1932 | Mancha et al. | 105/51 |
| 2,104,771 | 1/1938 | Saunders | 180/68.5 |
| 3,894,607 | 7/1975 | Brock | 180/68.5 |

FOREIGN PATENT DOCUMENTS 620627  3/1949  United Kingdom ................. 180/65 R Primary Examiner—Joseph F. Peters, Jr.
Assistant Examiner—Milton L. Smith
Attorney, Agent, or Firm—Ladas, Parry, Von Gehr, Goldsmith & Deschamps

[57] ABSTRACT

An electrically driven vehicle has a battery pack containing batteries in a support structure, there being defined a compartment in which the battery tops are located and a further compartment in which are the battery lower casings, said structure having inlet and outlet openings for the respective compartments, for through flow of cooling air lengthwise of the vehicle.

5 Claims, 4 Drawing Figures

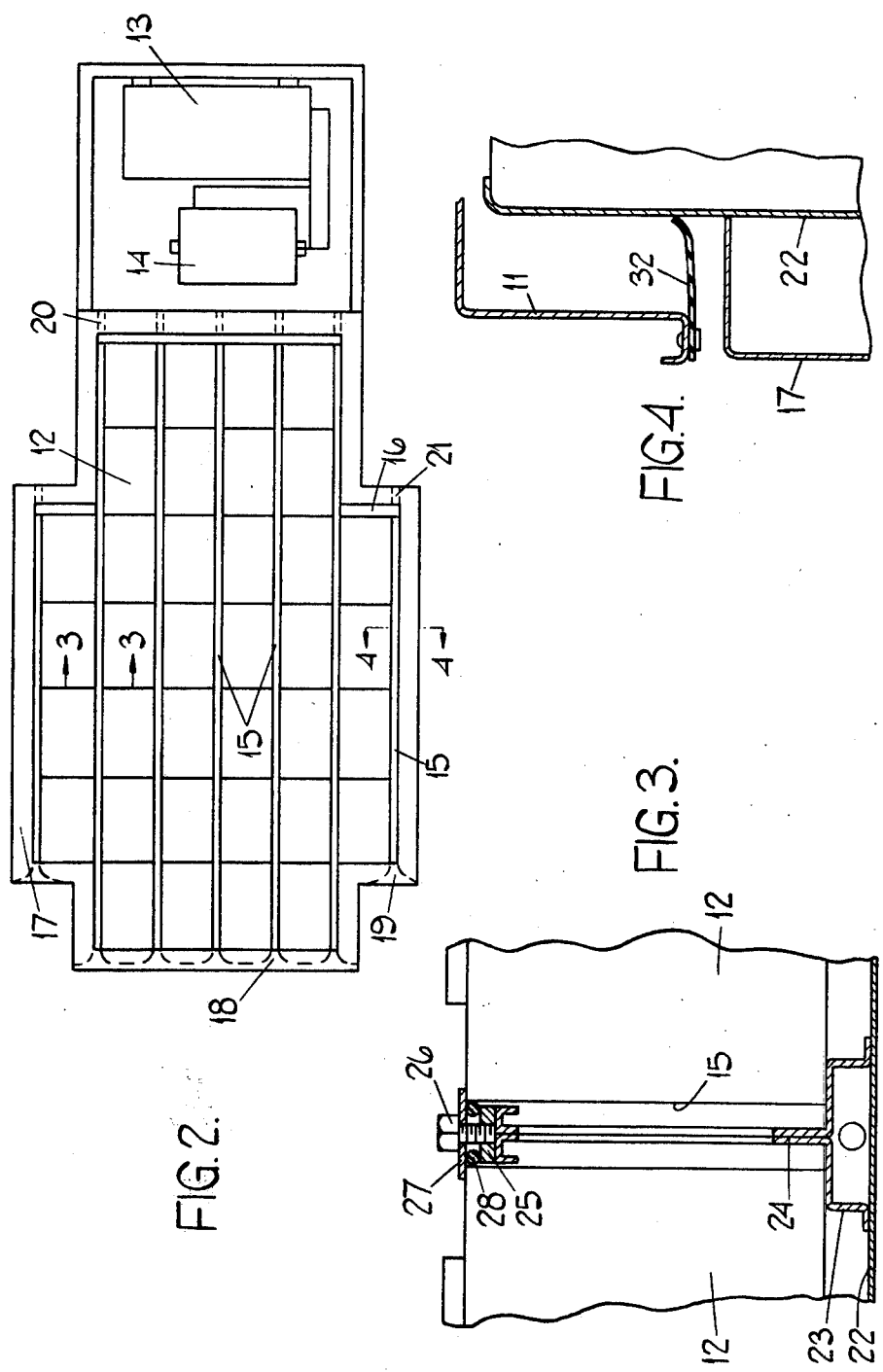

ELECTRICALLY DRIVEN VEHICLES

This invention relates to electrically driven vehicles of the kind provided with a plurality of rechargeable batteries which provide power to drive the vehicle wheels, through a driver control to an electric motor unit.

The batteries are, in use, charged from an external power source when the vehicle is not being used, for instance overnight. It is well known that during the charging process, batteries produce heat as well as quantities of gas and the latter must be evacuated from the region of the tops of the batteries. To accomplish this, it is common to provide for a flow of air across the tops of the batteries by means of a fan and this also serves to cool the battery tops. However during service, the extraction of power to drive the vehicle also generates heat, not just at the battery tops, but over the whole battery assembly.

It is the object of this invention to provide means for effectively cooling the batteries during use.

According to the invention an electrically driven vehicle provided with a plurality of rechargeable batteries which provide power to drive the vehicle wheels, through a driver control to an electric motor unit, characterized in that the batteries are contained in a support structure which provides two separate compartments, within one of which are the battery tops and within the other of which the lower casings thereof are accommodated, said structure providing ventilation openings for cooling air to flow through both said compartments, when the vehicle is in motion.

The invention will now be described by way of example with reference to the accompanying drawings in which:

FIG. 1 is a diagrammatic side elevation view of a vehicle provided with electric drive and incorporating the present invention, FIG. 2 is a plan view of the battery support structure and motor assembly of the vehicle shown in FIG. 1, FIG. 3 is an enlarged fragmentary section on the line 3—3 in FIG. 2, and FIG. 4 is an enlarged typical part section of the side of the battery support structure, on the line 4—4 in FIG. 2.

FIG. 1 illustrates, in outline, a goods carrying vehicle 10 of the kind normally fitted with an internal combustion engine and conventional transmission to the rear wheels. The engine normally occupies a position ahead of the front wheels in the compartment indicated at 10a.

The goods carrying compartment of the vehicle 10b has a floor platform indicated at 11. This has been shown extending to the front of the vehicle and into the engine compartment 10a. The platform 11 has a sloping portion near the front of the goods carrying compartment, this being indicated at 11a. In other vehicles, however, a flat floor is provided. In such cases fans (which will be described) are mounted between chassis stiffeners or other frame members (not shown) of the vehicle.

Beneath the floor platform 11 there is accommodated a unit carrying a number of batteries 12 and an electric motor 13 and transmission assembly 14 connected to drive the rear wheels of the vehicle. The batteries are connected to the electric motor through a driver control provide power to drive the vehicle wheels. The battery pack is carried in a support structure to be more fully described and occupies the space between the front and rear wheels of the vehicle. Access to it could be obtained by lifting sections of the floor platform 11. In an alternative, the batteries may be accessible only from beneath the vehicle, the battery pack being arranged to be lowered onto a trolley beneath the vehicle.

The motor 13 and transmission 14 are mounted at the rear wheels, the motor being behind those wheels.

The unit comprising the battery pack, motor and transmission is secured beneath the vehicle by means of fastening elements (not illustrated) and occupies at least part of the space normally allocated to the vehicle engine and conventional transmission. The vehicle is, in this example therefore, capable of conversion from internal combustion engine to electrical drive and adaptation may be carried out to vehicles originally fitted with engines or alternatively the electrical drive unit may be fitted as original equipment on the vehicle upon assembly thereof.

FIG. 2 shows a plan view of the unit and illustrates that the batteries 12 are arranged in lines extending lengthwise of the vehicle, the lines being spaced apart to leave ventilation ducts 15.

The batteries 12 are secured in the support structure against movement lengthwise of the vehicle by clamping devices which pack them towards the front of the structure. Spaces defined at the back of each line are indicated at 16. The clamping devices are not illustrated.

The support structure for the battery pack comprises a peripheral wall 17 having stepped sides. In the front of this peripheral wall are narrow vertical slots 18 with diverging entries, these slots 18 being aligned with the ventilation ducts 15 between the lines of batteries 12. These serve as inlet openings for ventilation air to pass through the ducts. There are further such openings 19 at the outer edges to allow air to flow along the outside of the outermost lines of batteries.

In the rear end of the peripheral wall there are outlet openings 20, 21 which are aligned respectively with the inlets 18, 19 and with the ducts 15.

The openings and ducts thus provide for through flow of air between the lines of batteries, such flow of air taking place when the vehicle is moving forward, as indicated by the arrows in FIG. 1.

Beneath the batteries and extending up their sides is a tray 22 which protects the underneath of the batteries from road dirt and splashing.

The batteries 12 are however, spaced above the base of the tray 22 and are supported on longitudinal box or top hat section elements 23, flanges of which are welded to the tray 22. The elements 23 carry upwardly extending perforated webs 24 which, like the box section elements, extend lengthwise of the battery lines, the webs occupying the ducts 15 between the adjacent lines. The upper ends of the webs 24, which are joined in pairs as shown in FIG. 3, are flanged. Each pair of flanges has secured to it a flat bar 25 having spaced screw threaded holes to receive screws 26 at intervals therealong. The screws pass through holes in a further strip 27 which overlies the adjacent edges of the batteries 12. Flexible sealing strips 28 are sandwiched between the strips 25 and 27 and are compressed to form seals between the ducts 15 and zones above the batteries 12.

The zone above the tops of the batteries 12 is further ventilated by through flow of air through the space 29 defined between the floor platform 11 and the tops of the batteries. This compartment is thus separated from the compartment containing the lower casings of the batteries 12. At the front of this compartment, in a zone which is deeper because of the upward sloping portion 11a of the floor platform are a pair of fans 30 which can be driven by electric motors forming part thereof. The fans are spaced apart laterally of the vehicle to provide substantially even flow across the width of the battery pack. At the rear of the space 29 a partition 31 is provided. In this are holes leading into flexible tubes 33 to direct the air flowing through the space 29 over the transmission and motor unit. To provide sealing, to prevent ingress of dirt and also to limit escape of gas at the sides of the battery pack, the lower side edge of the floor platform 11 is provided with a lip seal 32 rivetted in place and engaging the external vertical face of the tray 22.

With forward motion of the vehicle, air flows through the fans which are allowed to rotate to permit the passage of the air, though they are not electrically driven, and at the same time further air flows between the lines of batteries so that effective cooling of the tops as well as of the lower casings of the batteries is efficiently carried out to dissipate heat which is generated during extraction of electrical power from the batteries during use.

When the vehicle is not in use, for instance overnight, the batteries may be charged from an external source and the battery pack is provided with a charging socket (not illustrated) for this purpose. The socket however, incorporates a further connection which drives the fans 30 so that both heat and gases from the tops of the batteries are driven through the space 29 and evacuated at the rear of the vehicle. During this charging process none of the gas is allowed to enter the ducts 15 between the battery lines and there is no forced air flow through this lower compartment during charging.

I claim:

1. An electrically driven vehicle including a support structure, a plurality of rechargeable batteries mounted in the support structure and each having a battery top and a lower casing, an electric motor unit carried on the vehicle, a driver control whereby the electric motor can be regulated, connection means between the batteries and the electric motor unit for transmitting power from the batteries to run the electric motor unit, two separate compartments defined in the support structure, the battery tops being disposed in one of the compartments and the lower casings of the batteries being disposed in the other of the compartments, ventilation openings provided in said structure for allowing cooling air to flow through both said compartments, and fan means to force air through said compartment in which the battery tops are disposed.

2. An electrically driven vehicle as claimed in claim 1 in which the compartments have respective inlet and outlet openings for flow of air through them.

3. An electrically driven vehicle as claimed in claim 1 in which the batteries are arranged in lines extending longitudinally of the vehicle, the lines being spaced apart to define ducts through which air can flow in said compartment in which the lower casings are disposed.

4. An electrically driven vehicle as claimed in claim 1 in which there is sealing means between the battery support structure and part of the vehicle, to prevent escape of gas from the compartment in which the battery tops are disposed, at the sides of said compartment.

5. An electrically driven vehicle as claimed in claim 1 in which the batteries are supported in their support structure by releasable fastenings which pass through spaces between the batteries.

* * * * *